US012694325B2

(12) United States Patent
Zhu et al.

(10) Patent No.: US 12,694,325 B2
(45) Date of Patent: Jul. 28, 2026

(54) MACHINE LEARNING FRAMEWORK AND METHOD FOR USING THE SAME

(71) Applicant: STRIPE, LLC, South San Francisco, CA (US)

(72) Inventors: Tianshi Zhu, San Francisco, CA (US); Erik Osheim, Providence, RI (US); Thomas Switzer, Ontario (CA); Stephanie Bian, San Francisco, CA (US); David Abrahams, San Francisco, CA (US); Susan Tu, San Francisco, CA (US); Patrick Boykin, Maui, HI (US)

(73) Assignee: STRIPE, LLC, South San Francisco, CA (US)

( * ) Notice: Subject to any disclaimer, the term of this patent is extended or adjusted under 35 U.S.C. 154(b) by 1579 days.

(21) Appl. No.: 16/917,624

(22) Filed: Jun. 30, 2020

(65) Prior Publication Data

US 2025/0094853 A1    Mar. 20, 2025

(51) Int. Cl.
*G06N 20/00*        (2019.01)
*G06F 8/41*         (2018.01)
(Continued)

(52) U.S. Cl.
CPC ............. *G06N 20/00* (2019.01); *G06F 8/451* (2013.01); *G06F 8/453* (2013.01); *G06F 9/4881* (2013.01);
(Continued)

(58) Field of Classification Search
CPC ................ G06N 20/00; G06Q 20/4016; G06F 16/24568
See application file for complete search history.

(56) References Cited

U.S. PATENT DOCUMENTS

| | | |
|---|---|---|
| 9,424,562 B2 | 8/2016 | Dickelman |
| 9,613,343 B2 | 4/2017 | Doyle et al. |

(Continued)

FOREIGN PATENT DOCUMENTS

| | | |
|---|---|---|
| WO | 2015009427 A1 | 1/2015 |
| WO | 2018/031958 A1 | 2/2018 |
| WO | 2018/138423 A1 | 8/2018 |

OTHER PUBLICATIONS

International Preliminary Report and Written Opinion on the Patentability of Application No. PCT/US2021/039232 Mailed Jan. 12, 2023, 6 pages.

(Continued)

*Primary Examiner* — William Spieler
(74) *Attorney, Agent, or Firm* — FINNEGAN, HENDERSON, FARABOW, GARRETT & DUNNER, LLP

(57) ABSTRACT

A machine learning framework and method for using the same are described. In one embodiment, the method for processing data with a machine learning framework comprises creating a plurality of features as independent features, each feature of the plurality features being based on one or more events that model a plurality of records related to payment processing information, creating a final feature that groups the plurality of features together, such that each feature of the plurality of features represents a sub-feature of the final feature, compiling the plurality of features and the final feature, computing, using a computing platform, each of the plurality of features as a separate job, including sending network related communications to access the payment processing information from one or more remote storage locations, and computing, using a computing platform, the final feature separately from computing the plu- (Continued)

rality of features, including grouping results of running each of the plurality of features together.

25 Claims, 7 Drawing Sheets

(51) Int. Cl.

| | | |
|---|---|---|
| *G06F 9/48* | (2006.01) | |
| *G06F 16/2455* | (2019.01) | |
| *G06Q 20/40* | (2012.01) | |

(52) U.S. Cl.
CPC ... *G06F 16/24568* (2019.01); *G06Q 20/4016* (2013.01)

(56) References Cited

U.S. PATENT DOCUMENTS

| | | | | |
|---|---|---|---|---|
| 2009/0300615 | A1* | 12/2009 | Andrade | .............. G06F 9/5066 |
| | | | | 718/100 |
| 2012/0265262 | A1 | 10/2012 | Osorio | |
| 2012/0265626 | A1 | 10/2012 | Nielson et al. | |
| 2013/0054336 | A1 | 2/2013 | Graylin | |
| 2013/0117185 | A1* | 5/2013 | Collison | ........... G06Q 20/3829 |
| | | | | 705/67 |
| 2014/0358828 | A1 | 12/2014 | Phillipps et al. | |
| 2015/0073981 | A1 | 3/2015 | Adjaoute | |
| 2015/0254555 | A1 | 9/2015 | Williams, Jr. et al. | |
| 2016/0086185 | A1 | 3/2016 | Adjaoute | |
| 2019/0102415 | A1* | 4/2019 | Bishnoi | ................ G06F 16/244 |
| 2019/0354613 | A1 | 11/2019 | Zoldi et al. | |

OTHER PUBLICATIONS

International Search Report and Written Opinion on the Patentability of Application No. PCT/US2021/039232 Mailed Oct. 20, 2021, 22 pages.

Extended European Search Report received for European Application No. 21831632.1, mailed on Apr. 26, 2024, 8 pages.

Office Action received for European Application No. 21831632.1, mailed on Apr. 2, 2025, 9 pages.

* cited by examiner time $t$ − $batch\_size$          time $t$

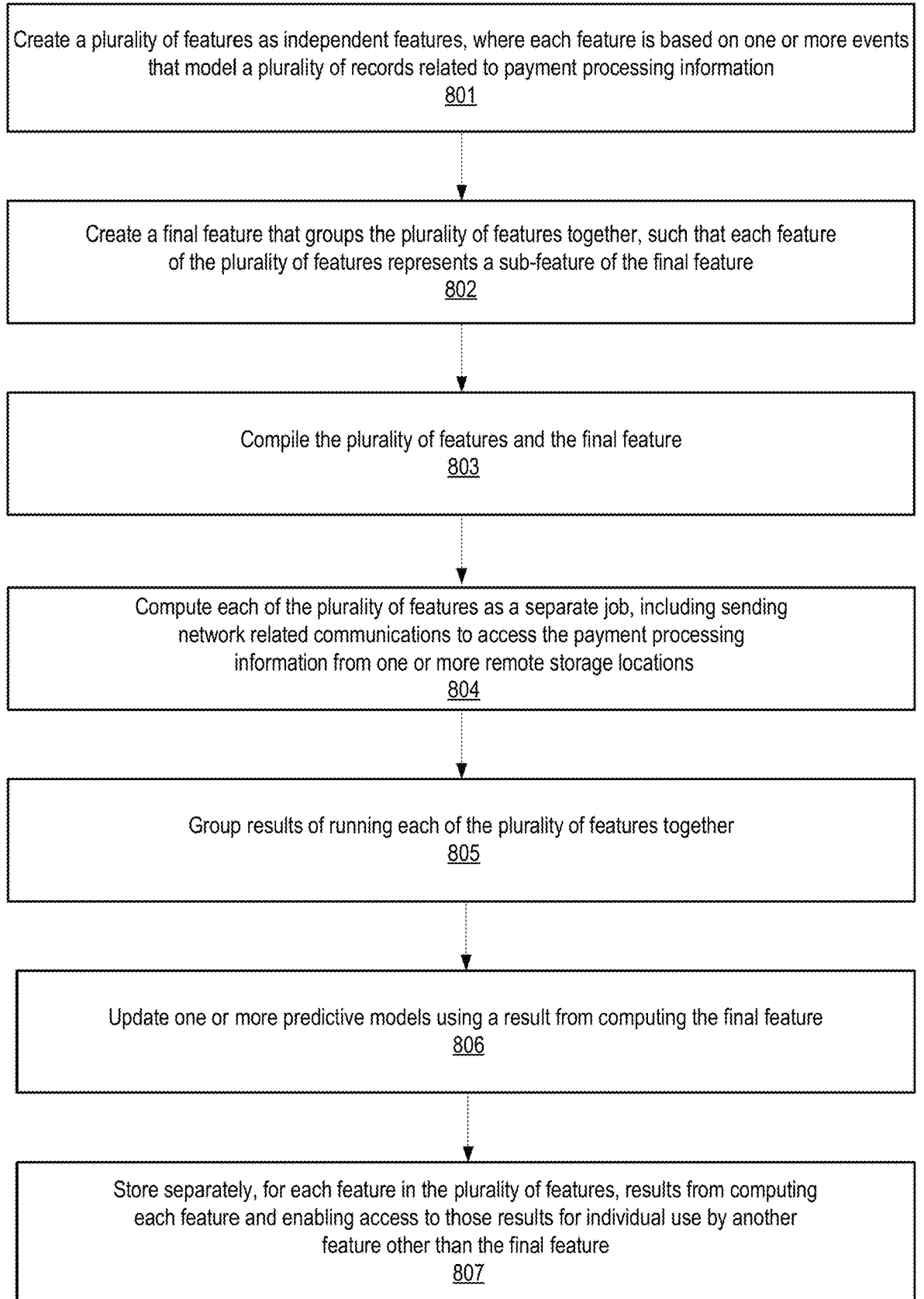

Create a plurality of features as independent features, where each feature is based on one or more events that model a plurality of records related to payment processing information
801

Create a final feature that groups the plurality of features together, such that each feature of the plurality of features represents a sub-feature of the final feature
802

Compile the plurality of features and the final feature
803

Compute each of the plurality of features as a separate job, including sending network related communications to access the payment processing information from one or more remote storage locations
804

Group results of running each of the plurality of features together
805

Update one or more predictive models using a result from computing the final feature
806

Store separately, for each feature in the plurality of features, results from computing each feature and enabling access to those results for individual use by another feature other than the final feature
807

FIG. 8

MACHINE LEARNING FRAMEWORK AND METHOD FOR USING THE SAME

COPYRIGHT NOTICE AND AUTHORIZATION

FIELD OF THE INVENTION

Embodiments of the present invention relate to the field of systems for processing commercial transactions; more particularly, embodiments of the present invention relate to use of a machine learning framework to process data related to commercial transactions.

BACKGROUND OF THE INVENTION

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

Building machine learning systems requires defining a set of inputs that accurately predict an outcome. Machine learning engineers need to define these sets of inputs, referred to as features, separately in batch for training and in real-time for production, often in different languages. Furthermore, the production infrastructure must be managed to compute features. This was not only toilsome, but led to inaccuracies and restricted the set of possible features available, resulting in worse models.

One problem faced by machine learning systems in defining their features is that several incompatible systems are used for producing feature values. Different teams used different processes, many of these were hard to work with, and data teams tended to move cautiously to avoid breaking existing features or models. Features were written in one language for training and another language for production scoring, and there were no real guarantees of the feature actually being the same. Additionally, the infrastructure is often custom for the feature generation, and that infrastructure had to be maintained. That severely constrained the types of features that can be written.

SUMMARY

A machine learning framework and method for using the same are described. In one embodiment, the method for processing data with a machine learning framework comprises creating a plurality of features as independent features, each feature of the plurality features being based on one or more events that model a plurality of records related to payment processing information, creating a final feature that groups the plurality of features together, such that each feature of the plurality of features represents a sub-feature of the final feature, compiling the plurality of features and the final feature, computing, using a computing platform, each of the plurality of features as a separate job, including sending network related communications to access the payment processing information from one or more remote storage locations, and computing, using a computing platform, the final feature separately from computing the plurality of features, including grouping results of running each of the plurality of features together.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 8 is one embodiment of a flow diagram of a process for performing machine learning feature generation and execution.

DETAILED DESCRIPTION

Figure 1:
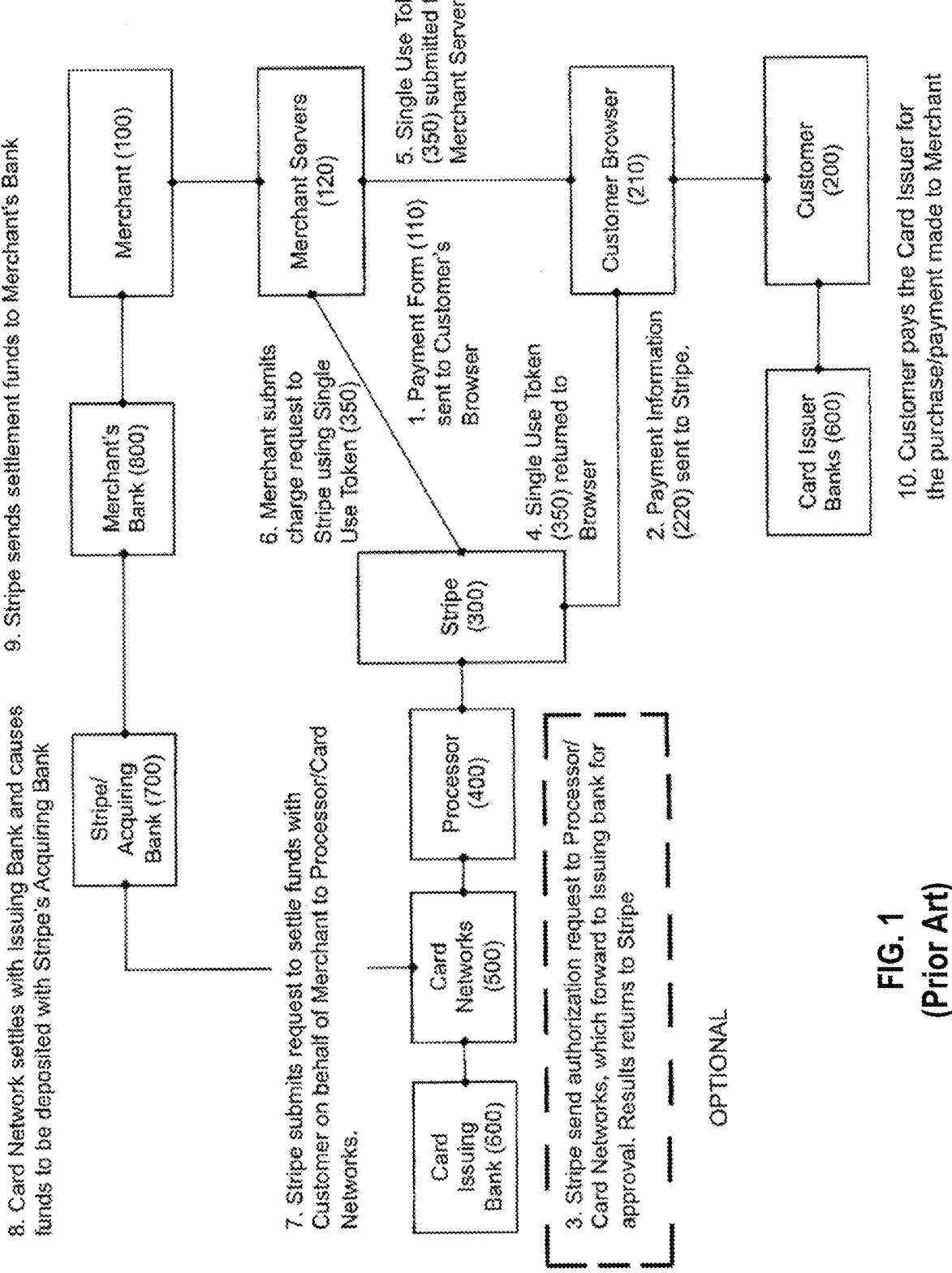
FIG. 1 shows a flow diagram of the steps and entities for implementing payment processing.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention is described in the context of an online payment acceptance service called Stripe® commercialized by Stripe, Inc., San Francisco, California.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank—A card issuing bank is a bank that offers card network or association branded payment cards directly to consumers. The issuing bank assumes primary liability for the consumer's capacity to pay off debts they incur with their card.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native application (app) installed onto the customer's device. The client-side application executes on the customer's electronic device.

Payment Processor—A payment processor, as referred to herein, is an entity or a plurality of entities that facilitate a transaction between a merchant site and a customer's electronic device. The payment processor includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830, 596, and 9,824,354. The Processor (400)/Card Networks (500) is involved in authorizing or validating payment information. In one embodiment, Stripe (300) and the Processor (400)/Card Networks (500) function together to authorize and validate payment information, issue a token, and settle any charges that are made. Accordingly, in one embodiment, the payment processor refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description. Accordingly, in this embodiment, the payment processor may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

A machine learning framework and method for using the same are disclosed. The machine learning framework is utilized to create models for prediction and analytics based on data that is collected and obtained. In one embodiment, the data corresponds to records related to payment processing information. The payment processing information includes transaction data corresponding to transactions for which payment processing is performed.

FIG. 1 shows a flow diagram of the steps and entities for implementing payment processing flow embodiments of the present invention.

At a high level, the payment processing framework described herein works as follows (FIG. 1):

1. A Merchant's Customer (200) uses an internet-enabled browser (210) to visit the Merchant's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.

3. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.

4. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5. The Payment Form (110) is submitted to Merchant's Servers (120), including the Single-use Token (350). More specifically, the payment processor sends the Token (350) to the client-side application, which, in turn, sends the Token (350) to the server-side application for use by the server-side application in conducting the transaction.

6. The Merchant (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.

7. Stripe (300) settles the charge on behalf of the Merchant (100) with the Processor (400) or directly with the Card Network (500).

8. The Card Network (500) causes the funds to be paid by the Card Issuing Bank (600) to Stripe (300) or to Stripe's Acquiring Bank (700).

9. Stripe (300) causes the settled funds to be sent to the Service Provider (100) (or to the Merchant's Bank (800)), net of any applicable fees.

10A. The Card Issuing Bank (600) collects the paid funds from the Customer (200).

An ML Framework

In one embodiment, a machine learning (ML) framework that enables the building and running of predictive models is disclosed. These predictive models use a set of inputs that are referred to herein as features. A feature is about an entity about which a prediction is being made. The framework provides a new way to build machine learning features by adapting a functional reactive programing (FRP) model for use in feature generation settings. The framework takes a discrete model of FRP, where events correspond to logged timestamped data. These events start as records in a durable log (e.g., a Kafka log). Those records are available for consumption in real-time from on-line storage and are also copied to a long-term data storage system (e.g., HDFS, S3, etc.), referred to herein as off-line storage. In one embodiment, an API is used by a user to define features in one place using only business logic.

Figure 2:
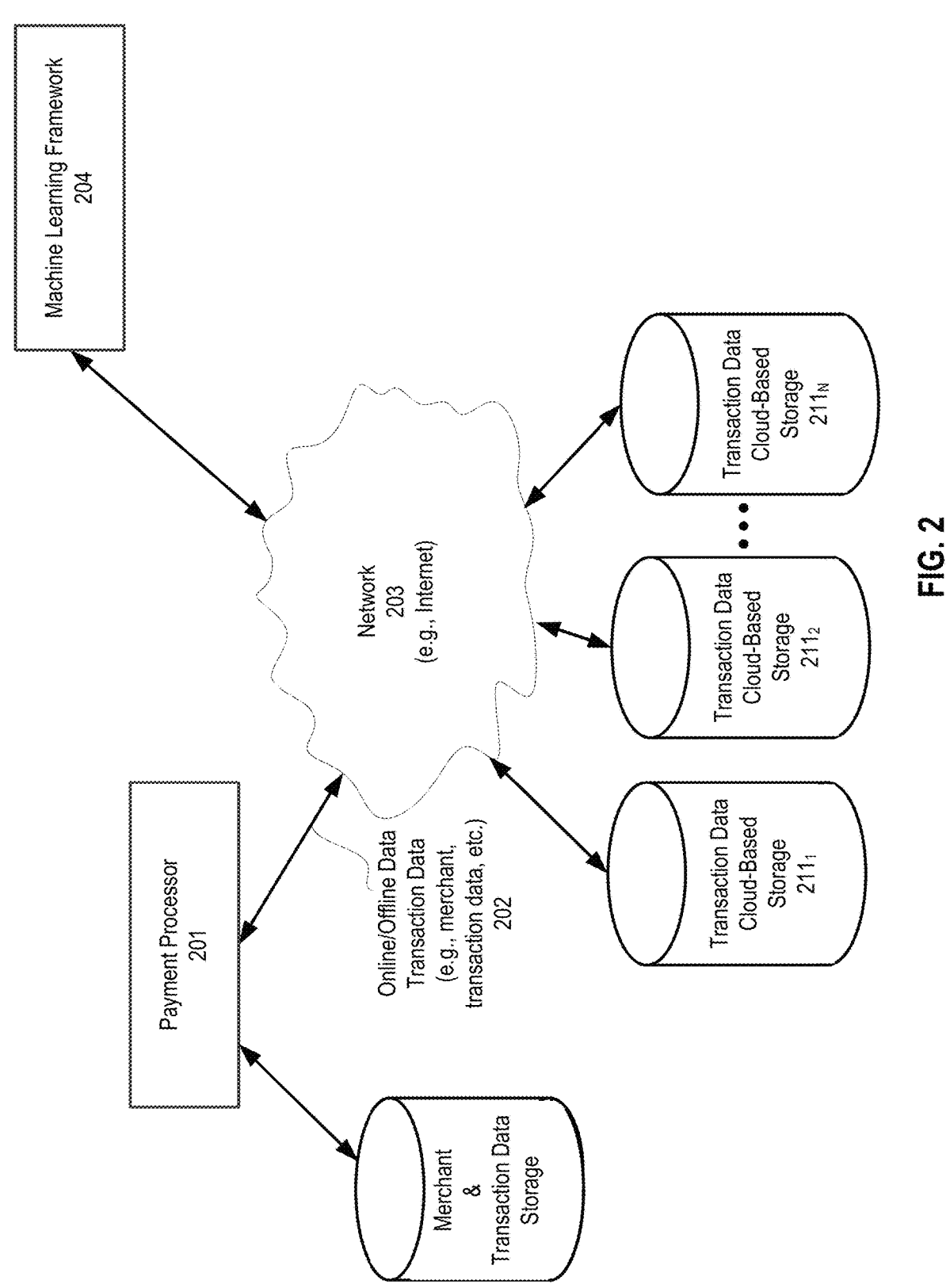
FIG. 2 is a bock diagram of a networked arrangement for a machine learning (ML) framework to access on-line and off-line storage of data.

In one embodiment, the ML infrastructure builds the tooling to create the batch jobs and runs the production infrastructure to calculate these features in real-time. FIG. 2 is a bock diagram of a networked arrangement for a machine learning (ML) framework to access data from one or both of on-line and off-line storage. Referring to FIG. 2, payment processor 201 performs payment processing operations, such as, for example, those described above. As part of performing payment processing operations, an on-line data storage 210, which may include transaction data related to transactions that are processed, merchant data, etc. After a predetermined amount of time, payment processor 201 transfer transaction data related to transactions that are processed to one or more cloud-based storage locations, referred to herein as transaction data cloud-based storage 211$_1$-211$_N$ or other off-line storage. In one embodiment, the transaction data is sent via network 203 (e.g., the Internet, etc.) for storage in one or more of transaction data cloud-based storage 211$_1$-211$_N$.

ML framework 204 accesses one or both of on-line transaction data from on-line storage 210 of payment processor 201 and off-line transaction data that is stored in transaction data cloud-based storage 211$_1$-211$_N$ to build features that enable a payment processor or other institutions (e.g., bank, merchant, etc.) to collect and summarize information about past charges (e.g., fraudulent and genuine) and train algorithms to identify patterns of fraud and authenticity, which may include transaction data related to transactions that are processed, merchant data, data from API request, as well as other data. The trained algorithm is referred to herein as a model. In this case, many types of events are used to collect high-quality information about charges. For purposes herein, these are referred to as charge features. The better the charge features, the better chance of producing a high-quality model.

In one embodiment, a framework includes a library for producing feature definitions, as well as compiling those feature definitions to different platforms. In one embodiment, these feature definitions are event-based, declarative, and powerful enough to express existing features as well as features which were previously impossible.

In one embodiment, features are defined in a single place and potentially shareable between applications. In this case, users don't need to worry about where historical data needed for features will be stored, or run their own infrastructure to compute features in real-time.

Figure 3:
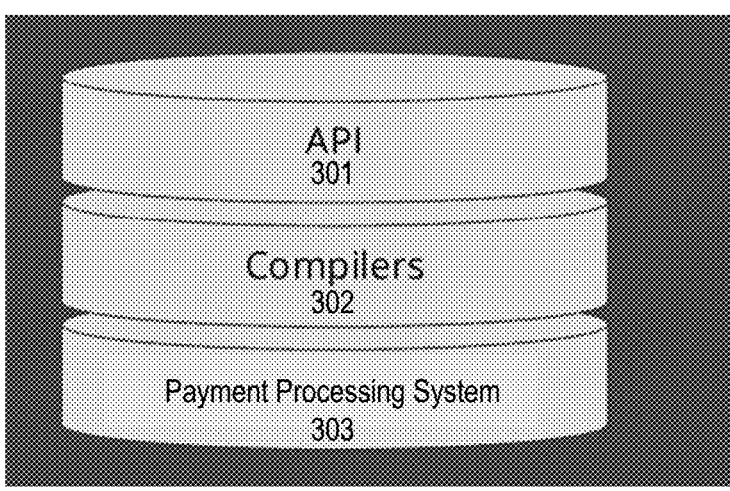
FIG. 3 is a block diagram of one embodiment of an ML framework and a payment processing system.

FIG. 3 illustrates one embodiment of the framework. Referring to FIG. 3, the framework includes a declarative API 301, a set of one or more compilers 302 and a system 303 upon which the compiled code is executed. In one embodiment, the declarative API 301 defines features from event streams (e.g., Kafka topics). Compilers 302 translate these definitions into different contexts (e.g., training data generation, backfills, real-time counters, etc.) and payment processing system 303 support real-time feature evaluation (e.g., Peddler, etc.). In one embodiment, systems 303 includes a number of different platforms. In one embodiment, the platforms include batch and real-time platforms. Examples of such platforms include, but are not limited to, Scalding, Spark, Flink, Kafka Streams, or any other platforms.

In one embodiment, design of framework has several goals. First, its declarative in nature, which enables the prevention of duplicate definitions, the consolidation of business logic in one place, and the maintenance of definitions as high-level and clear as possible. Second, the framework is platform independent so that definitions avoid baking in the implementation details of software platforms as mentioned above. Third, its typed such that as much as possible, types are used to catch definition errors at compile-time, or during tests, rather than in production.

Events and Features

In one embodiment, the framework allows for defining two main objects: events and features related to the payment processing system, and for compiling them to run on various batch and real-time platforms. The framework includes processing logic that accesses data from the payment processor (e.g., data from on-line and/or off-line storage) and uses the data when running the complied events and features on the platforms. The events and features are used for machine learning and for generating analytics, reports, etc. related to data associated with the payment processing system.

In one embodiment, in the framework, a record is an atomic set of data that occurs at a particular time. Records typically represent an action taken in the world (e.g., a charge in the payment processing system). In one embodiment, records are required to have a timestamp (when the record occurred). In the framework, the Event[E] type models a stream of records whose data can be represented by the type E. In one embodiment, in most cases, E will be a Thrift object or case class. The framework also maintains an internal timestamp for each record in the Event[E].

In one embodiment, an Event doesn't maintain any state and cannot be directly used to do any kind of summations or joins. The event combinators described in more detail below allow one to change the "shape" of records flowing through the stream, as well as filtering out certain records or expanding others into multiple new records.

For purposes herein, in order to distinguish Events from the discrete data they comprise, "Event" is used to mean a framework Event, and "record" to refer to the things inside an Event. In one embodiment, a "record" is analogous to a Kafka message, and an Event is analogous to a Kafka topic (which has Event messages flowing through it).

In one embodiment, the framework includes SourceEvent [E], which is a special type of Event in the API of the framework, which is an Event which has been read in directly from a data source (whether that is Kafka for online processing, S3/Mongo for offline processing, etc.). In one embodiment, SourceEvents can be transformed into Event via the Event combinators, but Events cannot be transformed into SourceEvents.

Unlike Event, which models a stream of discrete records, Feature represents a continuous function from time and key to value. More precisely, a feature represents a fact about an object of interest which has a value at every point in time in the past. For example, the question "How many charges has a payment processor processed for a given merchant?" is a valid feature: the question has a precise answer at all points in time. If a given merchant has not processed any charges, or does not exist, that merchant has processed 0 charges on the payment processor. In one embodiment of the framework, the type Feature[K, V] models a feature whose keys are of type K and whose values are of type V. For example, the above feature might have type Feature[Merchant Id, Long].

Features are often defined in terms of Events which influence their value. For example, a Feature might count the number of times a record occurs related to the object of interest (e.g., How many charges has the payment processor processed for a given merchant?), or sum values from records (e.g. How many total dollars has a merchant processed on Stripe?). Because Features are defined in terms of Events, and each record in an Event has a timestamp, the framework API makes time-traveling impossible. That is, the API makes it impossible to create a Feature which knows "How many dollars will each merchant process tomorrow?, or how many dollars will each merchant process this week?"

In one embodiment, the one way to create a Feature is by taking an event stream of key value pairs Event[(K, V)] and combining the values for each key: (Event[(K, V)], Combiner[V])→Feature[K, V]. A combiner gives a way to create an empty value of the type of V and a way to combine two values V1 and V2 to get a third.

In one embodiment, when defining a Feature in terms of an Event, it's necessary to show how to associate each record with a key (an object of interest). This usually involves a call to one of the map-like methods which will produce an Event[(K, V)]. For example, if charge requests contain type ChargeRequest=(amount: Double, merchantId: MerchantId, cardNumber: cardNumber) and there is a stream of charge requests to the API, Event[ChargeRequest], the merchant id and dollar amount are extracted in order to compute the "total dollars processed", by .maping the Event into Event[(MerchantId, Double)]. Then the "how any dollars has a merchant processed?" feature: Feature[MerchantId, Double] can be created.

When computing these Features and Events in either batch or online computing platforms, they are converted into representations the platforms can represent. In one embodiment, the underlying platforms are Scalding for batch processing and Peddler[^1] for real-time processing.

Ultimately, a Feature[K, V] or an Event[E] will have some state associated with it, such as interdependencies. In the process of building those representations, to refer to them, each instance of a Feature and Event has a name: String that is used to semantically identify it. This enables for optimizing and caching whenever needing to compute or update the same representation in two different places.

To implement a real system that builds a Feature from an Event stream, the events are partitioned by their key K, and then the values are combined in the time order in which they appear. Before any values have been seen, the empty value from the combiner is used. Thus, a Feature[K, V] can be thought of as a time-varying table with rows indexed by K and the columns having type V. For all times, and for all rows, there is a value V. If at time t a value for row K has not been seen, then the value will be the empty value for this Combiner[V].

In one embodiment, the combiner combines items using a numerical sum or by keeping the latest value, which is a very simple combiner that just ignores the oldest value of the two it is processing. Other common examples of combiners that may be used include multiplication, min, max, set union, list concatenation, merging hash-tables, taking the first or last, or any vectorized version of these operators.

In one embodiment, intermediate features are computed separately and joined all together at the end to get the final feature. More specifically, in one embodiment, a product of two features is created: product: (Feature[K, V 1], Feature [K, V 2])→Feature[K, (V 1, V 2)]. This supports feature sharing in the future, i.e., if two features A and B both contain Feature C, Feature C should only be computed once. Thus, in this case, the computations are restructured in a way that improves run-time and iteration time.

Figure 4:
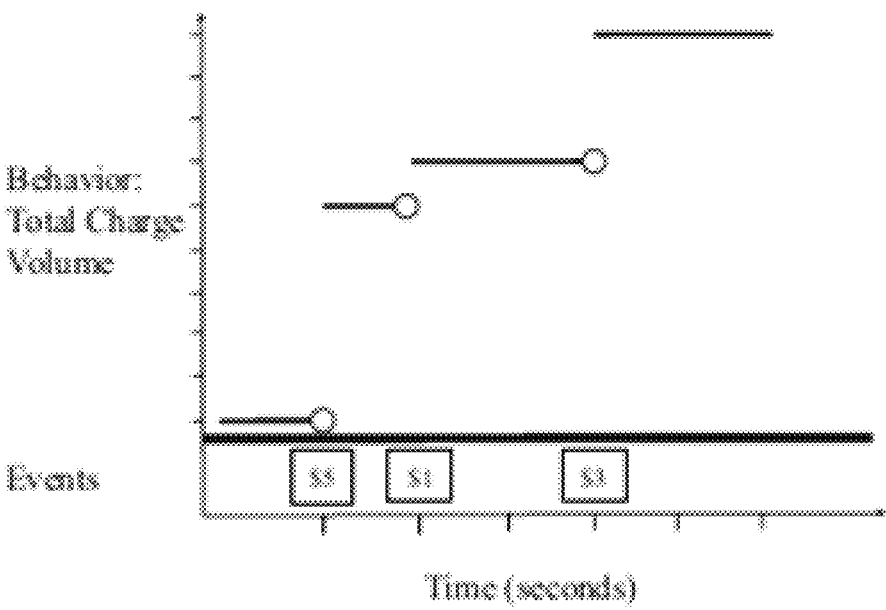
FIG. 4 illustrates a chart of Functional Reactive Programming (FRP) events and behaviors where the events are credit card charges and the behavior is the total charge volume.

As Feature describes a time-varying mapping from K to V and Event describes a stream of discrete timestamped data, a composable API is used to derive Features from Events, and to attach Feature values to the records in Events. For example, see FIG. 4 where events are credit card charges and a feature is the total charge volume. Note that the feature at time t is only defined in terms of t, aggregations of any events up to t, or other features' values at time t. An example of an API is provided below.

Combinators allow transformations of single Events and Features. In one embodiment, a combinator may return a Feature0 or Event0. This can be interpreted as "unnamed feature/event". Many combinators that work on Event will also work on Event0 (since Event[E] extends Event0[E]). If an Event is needed and an e0: Event0 already exists, it can be named via one of two methods:

val e: Event[E]=e0.generateName. In one embodiment, this is a macro that uses the fully-qualified name as the Event's name.

val e: Event[E]=e0.name ("some unique name")

In one embodiment, names refer to semantically unique items. If two Events or Features have the same name, they should be interchangeable. This name should be an equivalence: if two Events or Features have the same name, they are treated (and any past output) as equal. For example, two Features with the same name are expected to produce the same V for all Ks at the same point in time. This means if the semantic meanings are changed, they are given new names. If the changed Event or Feature has downstream Events or Features, they should also have new names. This is very important to understand, as modifying a production Feature or Event without changing its name can break backwards compatibility.

Combinators also allow composition of two Events, of two Features, and of a Feature and an Event. Table 1 below provides a list of combinators that may be used in one embodiment of ML framework.

| Input | Combinator | Output |
|---|---|---|
| Event[A] | map(A → B) | Event[B] |
| Event[A] | filter(A → bool) | Event[B] |
| Event[A] | ++(Event[A]) | Event[A] |
| Event[A] | withTimestamp | Event[(Time, A)] |
| Event[(K, V)] | combine((V, V) → V) | Event[K, V] |
| Event[K] | lookup(Feature[K, V]) | Event[K, V] |
| Event[K, V0] | zip(Feature[K, V1]) | Event[(K, (V1, V2))] |

In one embodiment, for single Event transformations, the framework provides the ability to process each record with a function (map), remove certain records from a stream (filter), and attached the event's timestamp to the record (withTimestamp).

In one embodiment, for combining two Events, the framework provides ++, which allows two streams to be merged together. The equivalent of ++ for a Feature is zip. A Feature can be built from an Event using combine, which combining all V s for each K in the stream, up to a given moment in time. Finally, a lookup is used to allow each record in Event to obtain the value of a Feature at the moment it occurred.

In one embodiment, because Event maintains a read-only timestamp for each record internally, this allows the API to express aggregations that are safe from traveling information back in time. The API does not allow a record in an Event to access information about any records in the future. In one embodiment, Events can only access information from other Events by doing lookups against derived Features, and all lookups are time-aware, and attach the value of a Feature at the moment a record occurred. In one embodiment, API prevents joining against data in the future, and allows recreation of historical state, as what a Feature would have been at a moment in the past can always be recomputed.

Events serve as the input to the system, and are generally backed by a distributed message queue, such as, for example, but not limited to, Apache Kafka. This means source data is write-only, and cannot be stateful. In order to support these use cases, events are emitted at the time a database transaction occurs, at the source of the transaction, which can be processed in the framework. Similarly, to support third-party APIs, requests can be made to the API, and events can be emitted with the responses to allow for recreating the values returned by the API in the past.

Below is an example feature definition. Note that the final feature is a construction of two other features defined prior to it. This is advantageous in that the code for features that comprise the final feature can be run in parallel and then joined together as intermediate features into the final feature. Note all that in one embodiment, after the results for the final feature are created by executing the code associate with the final feature, the features and the results of the individual features remain available individually. In this way, code associated with each of the features may be optimized in the future prior to being rerun in contrast to where a feature must be completely redone to optimize only a portion of the code supporting it.

Example Feature Definition

```
// source of charge requests
val chargeRequests =
Event.source("charge_requests")
// in order to know the volume for each merchant,
// sum the amount in each request for each merchant
val amountByMerchant = chargeRequests.map(req => (req.merchantId,
req.amount))
val volumeByMerchant = Feature.sum(amountByMerchant)
// to know the last card seen by a merchant
val merchantCardPair = chargeRequests.map(req => (req.merchantId,
req.cardNumber))
val mostRecentCardByMerchant = Feature.latest(merchantCardPair)
construct the final feature based on the two features above
val merchantFeature = volumeByMerchant
.zip(mostRecentCardByMerchant
```

Figure 5:
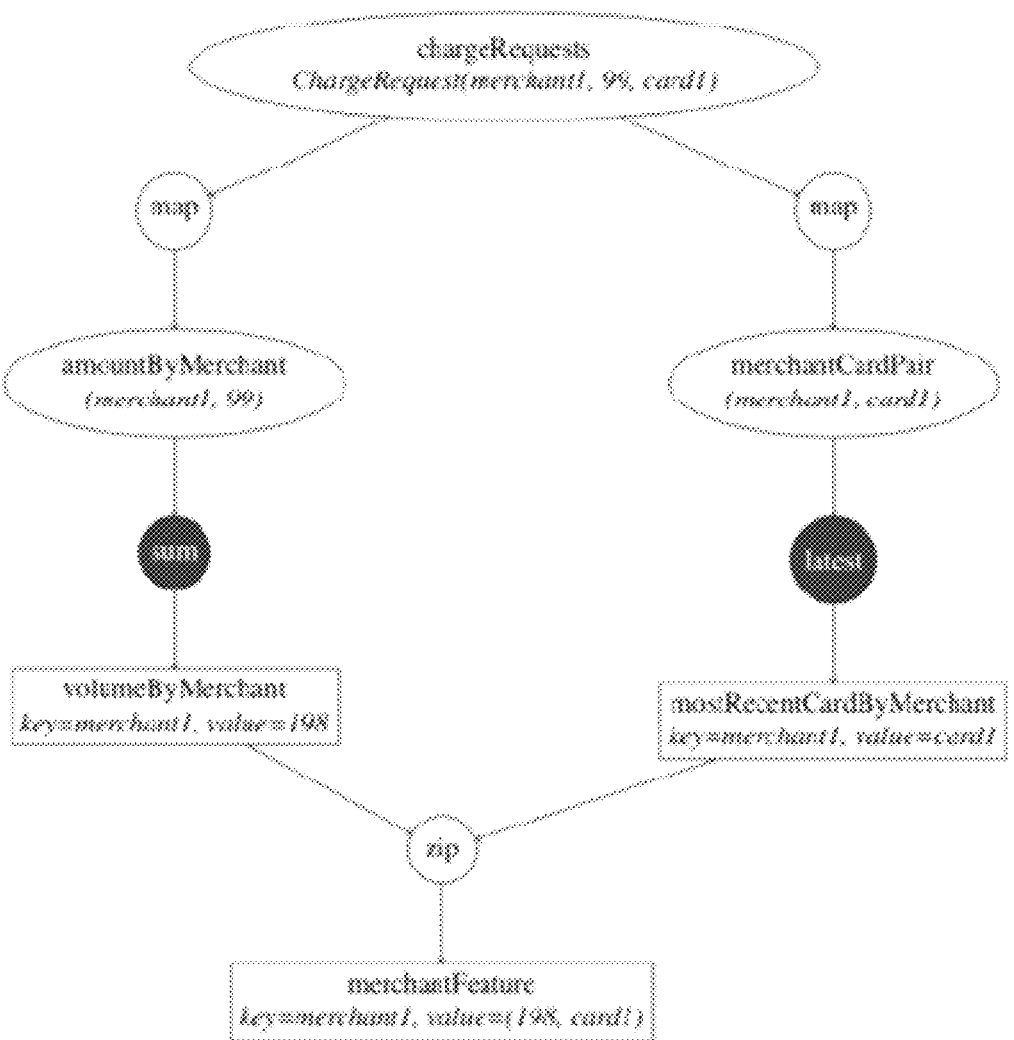
FIG. 5 is an example of a feature expressed as a directed acyclic graph (DAG).

FIG. 5 is an example of a feature shown above expressed as a directed acyclic graph (DAG). Referring to FIG. 5, events are depicted as ellipses, features as rectangles, and operations as circles. Below each feature/event is an example value. Note that sum/latest are aggregations over multiple events grouped by key.

In one embodiment, the framework describes a workflow using an API, and then the workflow is executed using the platform which fits the use case.

In one embodiment, HTTP service (peddler-srv) is integrated into Peddler. To deploy a feature, only one service needs to be deployed. Because a Feature[K, V] describes a time-dependent mapping from K→V, one use case for Feature is to describe a real-time aggregation, and then use Peddler to compute and serve this aggregation via HTTP requests. In addition, the integration of the http service into Peddler decouples different features, i.e., requests to ped-dler-srv for one feature cannot affect requests for another feature.

Peddler accepts requests for a given K and returns the current V for that key. These aggregations have many use cases, such as, for example, synchronous machine learning feature generation. For example, if interested in synchro-nously scoring charges to detect fraud, a Feature whose key is ChargeId and whose value is ChargeFeatureVector can be built. In the charge flow, requests can be made to Peddler for the current ChargeId, and the resulting ChargeFeatureVector can be fed to a model.

Feature[K, V] can also be used to describe real-time-aggregation shaped workflows. For example, if interested in how many charges each merchant has processed on the payment processor, a Feature[Merchant Id, Long] can be built, requests to Peddler can be made for the current charge count for a given merchant.

As an Event[E] describes a stream of Es that occur at discrete moments in time, the platforms have several ways to compute these Events, each with different use cases. For example, in some cases, an Event[(K, V)] is used as training data for a Machine Learning model. From the above example, the model's training data would be an Event [(Charge Id, ChargeFeatureVector)], where each ChargeId appears once in the Event. Using the Scalding-Adhoc plat-form, the Event can be computed over a given time-range, and it can be materialized to S3 for input to a training system.

Sometimes it is useful to incrementally materialize an Event[E]. This is particularly useful for auto-retraining purposes, as new model inputs can be produced each day using certain jobs (e.g., a Scalding-Incremental job).

Peddler supports computing and materializing an Event [E] in real-time. That is, Peddler can consume multiple SourceEvents, and then compute and output an Event derived from these sources. This is very useful for perform-ing stateful event transformations. For example, if Peddler is computing an Event[(MerchantId, MerchantFeatureVec-tor)], it can write the (MerchantId, MerchantFeatureVector) records to an output Kafka topic to be scored. In one embodiment, the output of a Peddler event transformation is a Kafka message, but it is also possible to build in other effects if there is a use case (e.g., making an HTTP request with the output records, writing to a database, etc.).

Examples of the framework and using Feature/Event to describe and execute a workflow include the following. For example, using the framework to generate Feature/Event for execution on Peddler to compute online real-time features for the transaction fraud model, using a Feature[Charge Id, Charge FeatureVector]. For merchant fraud modeling, the framework may be used in conjunction with Peddler to build online near real-time features for a merchant fraud model, by expressing their feature with an Event[(Merchant Id, Mer-chantFeatureVector)]. Peddler writes these features to Kafka, which are scored asynchronously. They are also able to reuse ChargeFeatureVector by having the Peddler write these features to a Kafka topic, which is an input to the Merchant Fraud framework feature. With respect to mer-chant controls, the framework may be used in conjunction with Peddler to monitor the number of new cards being seen by a merchant at any moment, which indicates the risk level of the merchant. This is a typical streaming use case, except that a "new card" is defined as a card that has not been seen by the merchant in the last 14 days. This requires storing state (the last seen time for a card, for a given merchant), which can be difficult to express in a normal streaming framework. With the framework (and Peddler), the tracking of such state is automatically handled.

Three evaluation contexts relevant to machine-learning applications include batch for producing offline training data, real-time for producing features for online model scoring, and in-memory for testing feature definitions in a continuous integration (CI) environment.

In order to produce offline training data, features must be evaluated over a historical time period. This often involves processing a high volume of data, for which distributed computing frameworks such as, for example, MapReduce and Spark, are used.

In one embodiment, the framework provides a generic platform compiler interface that can be extended to evaluate features on an arbitrary platform.

Figure 6:
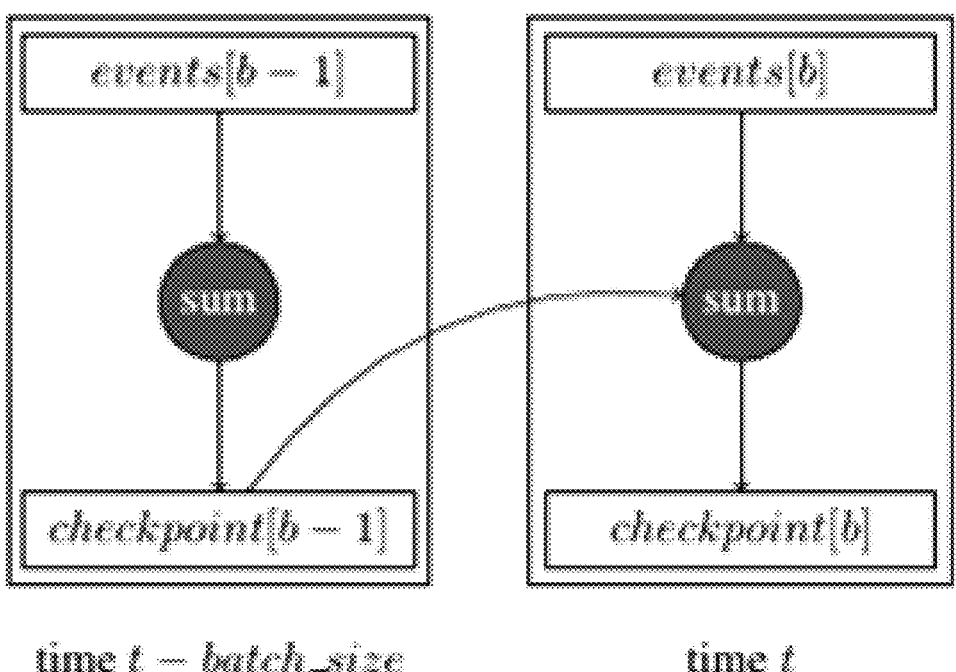
FIG. 6 is an example of an incremental batch computation using one embodiment of a ML framework.

In one embodiment, the platform compiler is extended to evaluate features in incremental batches. FIG. 6 is an example of incremental batch computation. Referring to FIG. 6, at time t, the checkpoint of the previous batch b−1 as well as the events for the current batch b are processed, and a checkpoint representing the state until time t is written. This allows events contained by the current batch interval to be processed once.

Figure 7:
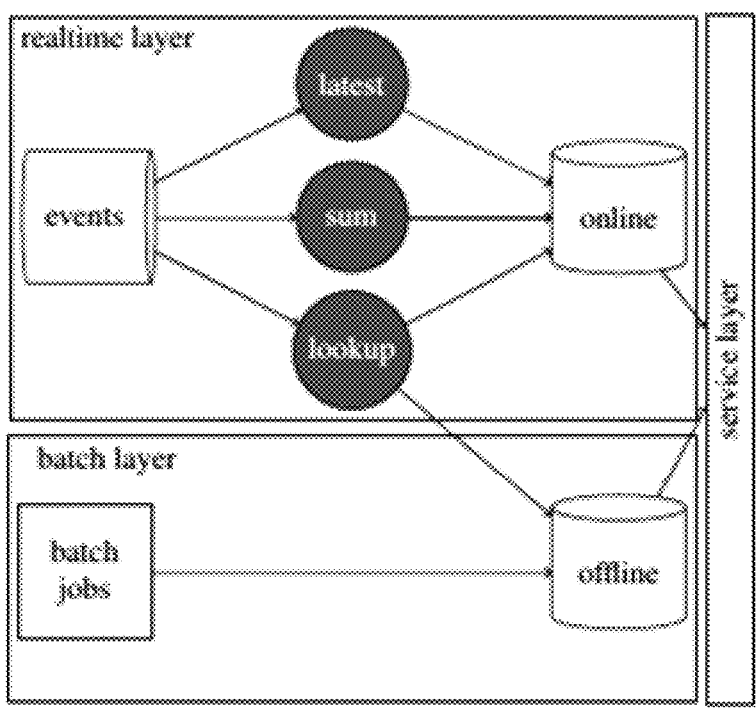
FIG. 7 is an example of a Lambda architecture that makes use of batch evaluation of features in order to evaluate in real-time.

In one embodiment, this interface to evaluate features at a generic batch interval is implemented using Scalding. Each run of the incremental batch job produces final feature values as well as checkpoint values, which can be used to resume computation for the following incremental run. That is, in one embodiment, backfill and incremental batch jobs write out checkpoints that can be used by future incremental runs. They also speed up re-runs of failed jobs; when we rerun, the job will not recompute the existing checkpoints. These checkpoints also enable a lambda architecture imple-mentation of real-time evaluation This enables a periodically updated view of all feature values. Without incremental evaluation, the entire history of input events would have to be processed for each batch run. FIG. 7 illustrates a Lambda architecture which makes use of batch evaluation of features in order to evaluate in real-time. Referring to FIG. 7, as the real-time (speed) layer processes events, operations over these events make use of the current online state, as well as the checkpointed state from the last batch run, to update the current online state. The serving layer combines these two data sources to produce the real-time feature value.

Many ML applications, such as, for example, fraud detec-tion on credit card payments, click prediction, cold start recommendation problems, etc. require low latency access to real-time features. These systems need to be able to generate a prediction or ranking before a web page can be loaded or a credit card transaction can be processed. To generate the features quickly, access to any events upon which a feature depends occurs in real-time.

Event ingestion may occur via some event bus such as Kafka. An event bus is a system that allows for a publish-subscribe messaging pattern. In such systems, events are published into an event-specific topic as they occur. A single topic can support any number of independent publishers, with all publishing events concurrently. Independently, any number of consumers can subscribe to a topic and asyn-chronously receive all events published to that topic, in the order in which they were published into the event bus. These systems allow low latency, asynchronous processing of events published into the event bus. However, in systems with a high volume of traffic, it often isn't possible for a single consumer to process the events in order quickly enough to keep up with the rate at which events are being published. To help improve throughput, most event buses have mechanisms to trade off some event ordering guaran-tees for the ability to process events concurrently. One such mechanism is batching, where you can retrieve multiple events at a time from a single consumer, allowing the consumer to concurrently process the entire batch. Another mechanism is to allow a single logical topic to be partitioned into multiple physical streams. This allows for grouping multiple consumers into a single logical "application", with each consumer only processing the partitions to which it is assigned. If willing to allow some events that occurred close to each other to be processed out of order, then an event bus, such as, for example, Kafka, can be used to implement a highly scalable, real-time feature generation system.

An Example Code for Platform Compilers

In one embodiment, the framework provides an adaptable batch compiler that can be extended to evaluate features on an arbitrary platform. One example interface is described in Listing 1. The platform specific compiler establishes data types that represent the collection of timestamped events, aggregations of keyed events, and joinable streams. Additionally, the compiler defines methods to produce these data types. Once defined, platform compilers may be used create a collection of timestamped events from an event/feature definition.

---

Listing 1. Extendable platform compiler

---

```
abstract class PlatformCompiler extends Serializable {
// Collection of timestamped events type Stream[T]
// Representation of a moncid
   aggregation by key
type SummedStream [K, V]
// Representation of a stream which can be joined.
// JoinStream provides an interface
   which enables concurrent joins and output of the final stream
type PlatformJoinStream[K, V] = JoinStream[K, V]
// Implementation of basic stream operations (produce an empty stream, map, concat)
def collection :
   PlatformCompiler.Collection[Stream]
// Produce a stream of data from an event definition
def getSource[E](event: Event[E]): Option[Stream[E]]
// Produce a BummedStream from Stream
   for a given Duration.
// Heavy keys may be provided to deal
   with skew.
def streamSum[K: OrderedData, V: Data:
   Monoid] (
   name: String,
   ex: Stream[(K, V)],
   within: Duration,
   maybeHeavyKeys:
      Option[HeavyKeys[K]]):
      SummedStream[K, V]
// Produce a joinable stream def joinStream[K: OrderedData, V:
   Data](s: Stream[(K, V)]):
   PlatformJoinStream[K, V]
// Below are implemented methods which are used to build the final feature/event
   stream.
// They have been stubbed out with '???' for brevity.
final def buildFeature[K, V](f:
   Feature[K, V]): Stream[(K, V)] = ???
final def buildEvent[E](e: Event0[E]):
   Stream[E] = ???
}
```

---

To make this more concrete, a compiler is provided for Scalding3, a DSL for Cascading. A high-level overview of one example implementation is in Listing 2. Notably, the collection of timestamped events is represented by a Scalding-specific data type TypedPipe[(Long, T)], which is a distributed collection of timestamped events of type T. In one embodiment, the implementations of ScaldingStream-Collection and ScaldingJoinStream make use of the Scalding operations on TypedPipe[T] to perform map, concatenate, and join operations between event streams.

---

Listing 2. A high-level view of a Scalding compiler

---

```
class ScaldingCompiler {
   trait ScaldingStream[A] {
      def toPipe: TypedPipe[(Long, A)]
   }
   type Stream[T] = ScaldingStream[T]
   case class ScaldingSum[K, V](
      stream: TypedPipe[(K, (Long, V))],
      monoid: Monoid[V],
      data: Data[V],
```

-continued

---
Listing 2. A high-level view of a Scalding compiler
---

```
   maybeHeavyKeys: Option[HeavyKeys[K]])
type SummedStream[K, V] = ScaldingSum[K, V]
// ScaldingJoinStream implements JoinStream
type PlatformJoinStream[K, V] = ScaldingJoinStream[K, V]
// A Scalding specific implementation of these collection methods
def collection:
        PlatformCompiler.Collection[Stream] = ScaldingStreamCollection
def streamSum[K: OrderedData, V: Data: Monoid](
   name: String,
   ex: Stream[(K, V)],
   within: Duration,
   maybeHeavyKeys: Option[HeavyKeys[K]]): SummedStream[K, V] =
   ScaldingSum(toKeyedPipe(ex),
        implicitly [Monoid [V] ], Data [V] , maybeHeavyKeys)
def joinStream[K: OrderedData, V: Data](s: Stream[(K, V)]):
     PlatformJoinStream[K, V] = ScaldingJoinStream(s)
                              }
```

Note that the platform compiler may be extended to support other batch processing frameworks, such as, for example, but not limited to, Spark. In this case, the operating datatype might be something like RDD[(Long, T)](one of Spark's distributed data types) and all implemented methods would be defined in terms of RDD operators. Similarly, as the industry evolves and other batch processing frameworks become popular, new compilers may be implemented to evaluate features with no changes to feature definitions themselves.

FIG. 8 is a flow diagram of one embodiment of a process for performing machine learning feature generation and execution. The process is performed by processing logic that comprises hardware (circuitry, dedicated logic, etc.), software (e.g., software running on a chip), firmware, or a combination of the three. While the payment processing system is shown as one system, in one embodiment, the payment processing system is implemented with more than one system (e.g., a plurality of processing devices, servers, computer systems, etc.).

Referring to FIG. 8, the process begins by processing logic creating a plurality of features as independent features, where each feature is based on one or more events that model a plurality of records related to payment processing information (processing block 801). In one embodiment, creating the features includes obtaining at least one feature of the plurality of features by aggregating events of the one or more events.

Processing logic also creates a final feature that groups the plurality of features together, such that each feature of the plurality of features represents a sub-feature of the final feature (processing block 802). In one embodiment, the features of the plurality of features and final features are user specified via an application programming interface (API), such as described, for example, below.

In one embodiment, at least one event of the one or more events of at least one feature of the plurality of features perform a lookup to attached a value of another feature to a feed in the at least one event. In one embodiment, the lookup retains all the information associated with an event. In one embodiment, the lookup retains only a key associated with an event. To perform lookups in parallel, a map operation can map all records related to a single key of interest into a reducer.

After features have been created, processing logic compiles the plurality of features and the final feature (processing block 803). In one embodiment, framework jobs are compiled to run on many streaming (online) and batch (offline) platforms and the techniques described herein are not limited to running on certain platforms. In one embodiment, two primary compilers and platforms on which to run the framework are:

Scalding: Scalding is a primary batch framework platform for one embodiment of the framework. The core capability of the Scalding platform is to compute historical records in an Event[E], most commonly used to generate training data.

Peddler: Peddler is a primary streaming framework platform for one embodiment of the framework. Peddler is able to maintain an up-to-date view of a Feature[K, V], and to compute and output (to a store or message bus) an Event[E] in real-time.

Using one or more computing platforms, processing logic computes each of the plurality of features as a separate job, including sending network related communications to access the payment processing information from one or more remote storage locations (processing block 804) and the final feature separately from computing the plurality of features, including grouping results of running each of the plurality of features together (processing block 805). In one embodiment, running each of the plurality of features as a separate job comprises running two or more features of the plurality of features in parallel.

In one embodiment, data from computing the plurality of features is stored in columnar format, and wherein grouping results of running each of the plurality of features together as part of computing the final feature is made, at least in part, based on the columnar format.

The result of the computation is data that is desired for model training and/or analytics. Using results of computation, processing logic optionally updates one or more predictive models using a result from computing the final feature (processing block 806).

Also, in one embodiment, after computing the final feature, processing logic storing separately, for each feature in the plurality of features, results from computing each feature and enabling access to those results for individual use by another feature other than the final feature (processing block 807). In this way, the results of the individual features remain available individually as opposed to only having access to results of the final feature. This allows them to be accessed for use by other intermediate or final features. Furthermore, this separation performs intermediate features to be optimized individually in the future without having to redo all features at the same time.

An Example API for the ML Framework

Assuming the following case class and SourceEvent definitions exists:

```
import com.stripe.semblance.v2.{Event, Feature}
import com.stripe.semblance.v2.Event.SourceEvent
case class ChargeId(id: String)
case class Currency(code: String)
case class MerchantId(id: String)
case class CardNumber(number: String)
case class Amount(amount: Int)
case class Country(country: String)
case class ChargeRequest(chargeId: ChargeId, merchantId:
MerchantId,
amount: Amount, cardNumber: CardNumber, currency: Currency)
case class MerchantAccountApplication(merchantId: MerchantId,
country:
Country, ownerName: Option[String])
case class ChargeDispute(chargeId: ChargeId)
// an Event corresponding to a charge-request to the Stripe API
val chargeRequests: SourceEvent[ChargeRequest] = ???
// an Event corresponding to a merchant account application (emitted
whenever a new merchant signs up for Stripe)
val accountApplications:
SourceEvent[MerchantAccountApplication] = ???
// an Event corresponding to a charge dispute from the cardholder.
val chargeDisputes: SourceEvent[ChargeDispute] = ???
```

In one embodiment, SourceEvents are stubbed out.

Event

As an Event[E] represents a stream of Es, Event has combinators similar to Scala collections such as List and Stream. Note that a number of combinators are described herein. However, the techniques disclosed herein are not limited to these combinators and may be used with other combinators.

Map-Like Functions

In one embodiment, all map-like functions can operate on Event0s, and return Event0s. They can also operate on Events, (as Event extends Event0) but they will still return Event0s.

Map def map[E1](fn: E=>E1): Event0[E1]

This converts an Event0[E] to an Event0[E1] via E=>E1. For example, if a stream of chargeIds is wanted from the stream of charge requests:

val chargeIds: Event0[ChargeId]=chargeRequests.map
(_.chargeId)

To get a stream of (Amount, Currency) pairs:

```
val amountCurrencyPairs: Event0[(Amount, Currency)] = chargeRequests.map {
chargeReq: ChargeRequest =>
  (chargeReq.amount, chargeReq.currency)
}
```

Filter def filter(p: E=>Boolean): Event0[E]

If p returns true, the record is kept, otherwise it is ignored. For example, to get a stream of only Lyft's charges:

```
val lyftID = MerchantId("acct_123456789rideshare")
val lyftCharges: Event0[ChargeRequest] = chargeRequests.filter(_.
merchantId == lyftID)
```

Collect/OptionMap

```
def collect[E1] (pf: PartialFunction[E, E1] ) : Event0[E1]
def optionMap[E1] (fn: E => Option[E1] ) : Event0[E1]
```

Both of these functions allow filter+maps in one call. For example, if Lyft's charge amounts are wanted, then the following may be used:

```
// via collect
val lyftChargeAmounts: Event0[Amount] = chargeRequests.collect {
  // we drop all feeds which do not match this case
  case ChargeRequest (_, lyftID, amount, _, _) => amount
}
// equivalently, via optionMap
val lyftChargeAmounts: Event0[Amount] = chargeRequests.optionMap {
chargeReq: ChargeRequest =>
  if (chargeReq.merchantId == lyftID) Some(chargeReq.amount)
  else None
}
``` withTimestamp def withTimestamp: Event0[(E, Timestamp)]

In one embodiment, this pairs each record with its logical timestamp. When a SourceEvent is created, an indication of how to associate each record with a timestamp is needed. The framework uses the SourceEvent's timestamps to compute timestamps in all subsequent derived Events. For example, if val derivedEvent=sourceEvent.map(f), each record in sourceEvent will have a corresponding record in derivedEvent, with an identical timestamp. Note these timestamps are read-only, which prevents accidental time-traveling of information (e.g., val derivedEvent=sourceEvent.withTimestamp.map(_._2-100)) does not actually modify derivedEvent's timestamps; as derivedEvent. withTimestamp can be used to recover the true timestamp.

concatMap def concatMap[E1](fn: E=>Iterable[E1]): Event0[E1]

Scala's collections call this flatMap, but concatMap is preferred. It allows for each record in an Event to expand into multiple records.

mapValues-Like Functions

These functions are similar to the map-like functions above, except they operate on Event0[(K, V)]s.

mapValues

```
// called on an Event0[(K, V)]
def mapValues[V1] (f: V => V1): Event0[(K, V1)]
```

Similar to .map, but this function maps the V of an Event0 whose inner type is (K, V). For example, if interested in separating charges using USD from other charges, the following may be used:

```
val chargesWithCurrency: Event0[(ChargeId, Currency)] =
  chargeRequests.map(req => (req.chargeId, req.currency))
val chargesWithIsUsd: Event0[(ChargeId, Boolean)] =
```

-continued

```
chargesWithCurrency.mapValues(currency => currency.code ==
"USD")
``` mapValuesWithKey

```
// called on an Event0[ (K, V) ]
def mapValuesWithKey[V1] (f: (K, V) => V1) : Event0[ (K, V1) ]
```

Similar to .mapValues, except the key is used to generate the new value.

Merge-Like Functions

++ def++(that: Event0[E]): Event0[E]

This allows two Event0[E]s to be merged together (similar to how two List[E] can be concatenated together).

```
val lyftChargeAmounts: Event0[Amount] = ...
val doordashChargeAmounts: Event0[Amount] = ...
val lyftAndDoorDashChargeAmounts = lyftChargeAmounts ++
doordashChargeAmounts
```

Note that lyftAndDoorDashChargeAmounts can be defined more like this:

```
val lyftAndDoorDashChargeAmounts: Event0[Amount] = chargeRequests.
optionMap { chargeReq =>
    val merchantId = chargeReq.merchantId
    if (merchantId == lyftID || merchantId == doordashID) Some(amount)
    else None
}
``` either def either[E1](that: Event0[E1]): Event0[Either[E, E1]]

This allows two Event0s with different inner-types to be merged together, by lifting the inner type to an Either.

```
val chargesAndDisputes: Event0[Either[ChargeRequest, ChargeDispute] ]
=
chargeRequests.either(chargeDisputes)
```

Data+OrderedData

Before discussing how to create Features, an internal serialization framework of the ML framework is explained.

In order to compute Features/Events, the ML framework uses a safe, round-tripping serialization for the inner E, K, and V types in Event[E] and Feature[K, V]. This is accomplished by requiring a Data[_] instance for the type that needs to be serialized. Similar to how circe's Encoder/ Decoder provide a way to serialize/deserialize from json, Data allows Semblance to serialize/deserialize from Array [Byte].

In one embodiment, an OrderedData[_] instance is required. Generally, OrderedData[K] is required to produce a Feature[K, V]. For example, the Feature.latest combinator has the following signature:

def latest[K: OrderedData, V: Data](event: Event[(K, V)]): Feature[K, Option[V]]

An implicit OrderedData[K] and implicit Data[V] is required in order to use Feature.latest on an Event[(K, V)].

For case classes, as long as all of the arguments have Data/OrderedData, it is possible to automatically derive Data/OrderedData instances. For the case classes, this looks like:

```
import com.stripe.semblance.data.{OrderedData, Data}
case class ChargeId(id: String)
object ChargeId {
    implicit val ordDataChargeId: OrderedData[ChargeId] = OrderedData.generic
}
case class Currency(code: String)
object Currency {
    implicit val ordDataCurrency: OrderedData[Currency] = OrderedData.generic
}
case class MerchantId(id: String)
object MerchantId {
    implicit val ordDataMerchantId: OrderedData[MerchantId] = OrderedData.
generic
}
// etc.
```

Now that the types can be serialized, Features can be created.

Aggregating Events into Features

In one embodiment of the framework, Features are obtained by performing aggregations on Events. Because Feature[K, V] has two type parameters—a Feature can give a V for all Ks at any time t—aggregating an Event into a Feature[K, V] often requires the Event to be of type Event [(K, V)]. Turning an Event[E] into Event[(K, V)] is known as "keying" the Event, and is typically possible using one of the map-like combinators on Events. Examples of this are below.

Sum-Like Functions

Feature.size def size[K, V](event: Event0[(K, V)]): Feature0[K, Long]

This counts the numbers of times each key has been seen. For example, if know many charges Stripe has processed for a given card number is wanted:

```
val numChargesForCard: Feature0[CardNumber, Long] = Feature.size
(chargeRequests.map(_.cardNumber).withUnit)
```

Note how this feature knows how many charges the payment processor has processed for any card number. If the payment processor has never seen a card number, or the card number is invalid, the feature's value is 0 L.

Feature.sum def sum[K, V: Monoid](event: Event0[(K, V)]): Feature0 [K, V]

The resulting Feature0[K, V] knows "what is the sum of all past vs, for each K?" For example, if the total charge volume of each merchant on Stripe is desired:

```
// we need some way to map currencies into dollars
def toUsd(amt: Amount, currency: Currency): Double = ???
val keyedChargeAmounts: Event0[(MerchantId, Double)] =
chargeRequests.map (req => (req.merchantId, toUsd(req.amount,
req.currency))) val merchantChargeVolume: Feature0[MerchantId,
Double] =
Feature.sum (keyedChargeAmounts)
```

Alternatively, Feature.sum can be written like this:

```
import com.twitter.algebird.macros.caseclass.monoid
import com.twitter.algebird.Monoid
case class AmountInUsd(amount: Double) // amount, in cents
object AmountInUsd {
    implicit val monoidAmountInUsd: Monoid[AmountInUsd] =
    monoid[Amount InUsd]
    implicit val ordDataAmountInUsd: OrderedData[AmountInUsd] =
    OrderedData.
generic
}
def toUsd(amt: Amount, currency: Currency): AmountInUsd = ???
val keyedChargeAmounts: Event0[(MerchantId, AmountInUsd)] =
chargeRequests. map(req => (req.merchantId, toUsd(req.amount,
req.currency))) val merchantChargeVolume: Feature0[MerchantId,
AmountInUsd] = Feature.sum (keyedChargeAmounts)
```

Feature.sumWith

```
def sumWith[K, V] (event: Event0[ (K, V) ], monoid: Monoid[V] ) :
Feature0[K, V] =
```

Similar to Feature.sum, but the Monoid[V] can be explicitly provided. The merchant charge volume feature could have been written like this:

```
val merchantChargeVolume: Feature0[MerchantId, AmountInUsd] =
Feature.
sumWith(keyedChargeAmounts, monoidAmountInUsd)
```

Note that because Feature.sum and Feature.sumWith work for any Event[(K, V)] where V: Monoid, more aggregations can be performed than simple summations of Int/Double/Long. In one embodiment, the framework can compute an aggregation as long as provided:

A way to serialize/deserialize V (with Data[V])

An associative addition operation for V (with Monoid[V])

An identify element for the addition operation (also from Monoid[V])

For example, if we want to know the average charge-amount for each merchant, we can use Algebird's AveragedValue.

```
import com.twitter.algebird.AveragedValue
import
com.stripe.semblance.v2.Serializations.orderedDataForAveragedValue
val averageChargeAmount: Feature0[MerchantId, AveragedValue] =
Feature.sum(keyedChargeAmounts.map {
    case (merchantId, amountInUsd) => (merchantId, AveragedValue
(amountInUsd.amount))
    })
```

Latest-Like Functions

Feature.latest def latest[K, V](event: Event0[(K, V)]): Feature0[K, Option[V]]

The resulting Feature0 knows "what is the most recent V we've seen for each K?" However, because the feature is defined for all Ks, at every point in time, the feature's 2nd type parameter is Option [V]. If a key has not been seen yet, the feature's value is None.

For example, if the most recent merchant who processed a transaction for a given card is wanted:

```
val cardNumberMerchantPairs: Event0[(CardNumber, MerchantId)] =
chargeRequests.map(req => (req.cardNumber, req.merchantId)) val
mostRecentMerchant: Feature0[CardNumber, Option[MerchantId]] =
Feature.
latest(cardNumberMerchantPairs)
```

Feature.latestWithinDuration

```
def latestWithinDuration[K, V] (event0: Event0[(K, V)], within:
Duration):
Feature0[K, Option[V]]
```

Identical to Feature.latest, except this feature is "forgetful": its value is None if no records have occurred for a given key within the specified duration. This is useful for Features that are only concerned with recent records, as limiting the within duration greatly reduces the amount of data that must be read and computed.

For example, to get the most recent charge for each merchant, within the last week, the following can be used:

```
import scala.concurrent.duration.{DAYS, Duration}
val latestChargeForMerchant: Feature0[MerchantId,
Option[ChargeId]] =
    Feature.latestWithinDuration(chargeRequests.map(req =>
    (req.merchantId,
    req.chargeId)),
            Duration(7, DAYS))
```

Other Feature Combinators

Map def map[V1: Data](fn: V=>V1): Feature0[K, V1]=

Similar to Event's map, this allows a Feature0[K, V] to be converted to a Feature0[K, V1] via V=>V1. For example, the previous average-charge Feature could be much clearer if the AveragedValue is mapped back into AmountInUsd:

```
val averageChargeAmount: Feature0[MerchantId, AveragedValue] =
    Feature.sum(keyedChargeAmounts.map {
        case (merchantId, amountInUsd) => (merchantId, AveragedValue
(amountInUsd.amount))
    })
val averageChargeInUsd: Feature0[MerchantId, AmountInUsd] =
    averageChargeAmount.map(averagedValue =>
    AmountInUsd(averagedValue.
value))
```

Zip def zip[V1](that: Feature0[K, V1]): Feature0[K, (V, V1)]=

This allows two features with the same K type to be zipped together. For example, if a feature that both has a merchant's total charge volume and their average charge volume is wanted, the following could be used:

```
// defined above
val merchantChargeVolume: Feature0[MerchantId, AmountInUsd] = . . .
val averageChargeAmount: Feature0[MerchantId, AveragedValue] = . . .
val totalAndAverageChargeVolume: Feature0[MerchantId, (AmountInUsd,
```

24

-continued

```
AveragedValue) ] =
    merchantChargeVolume.zip(averageChargeAmount)
```

Feature.of

Feature.of is a generalization of zip which works nicely with case classes. The following is an example.

```
val merchantCountry: Feature0[MerchantId, Option[Country] ] =
    Feature.latest(accountApplications.map(accApp =>
    (accApp.merchantId, accApp.country) ) )
```

Now there are three merchant-keyed features and they can be combined into a single feature using Feature.of:

```
case class MerchantInfo(registrationCountry: Option[Country],
        totalVolume: AmountInUsd,
        averageCharge: AveragedValue)
val merchantFeature: Feature0[MerchantId, MerchantInfo] = Feature
    .of[MerchantInfo]
    .fromFeature0s(
        merchantCountry,
        merchantChargeVolume,
        averageChargeAmount
    )
```

Also, fromFeatures (rather than fromFeature0s) may be used if there are named features, e.g., the features' types are Feature[K, V].

Lookups

Events also have the ability to perform lookups into Features. This "attaches" the feature's value to the feed in the Event, at the moment the feed occurred. In one embodiment, all lookups are done with named Feature/Event.

lookupKey

```
// called on an Event[K]
def lookupKey[V] (feature: Feature[K, V] ) : Event [ (K, V) ] =
```

For example, to transform the Event of charge requests into an Event when the payment processor receives a charge request, an Event is produced that has the card number, and how many charges that the payment processor has processed for that card number:

```
val numChargesForCard: Feature[CardNumber, Long] =
    Feature.count(chargeRequests.map(_.cardNumber) ) .
generateName val cardNumbers: Event[CardNumber] =
chargeRequests.map(_.cardNumber) . generateName
val cardNumbersWithChargeCounts:
    Event[ (CardNumber, Long) ] =
    cardNumbers.lookupKey(numChargesForCard)
```

Lookup

```
// called on an Event[ (K, U) ]
def lookup [V] (feature: Feature[K, V] ) : Event[ (K, (U, V) ) ] =
```

This is similar to lookupKey, but it allows us to retain some information about the Event other than its key. Modifying the example above, to retain all of the information from the original charge request?, the following may be used:

```
val chargesKeyedByNumber: Event[ (CardNumber, ChargeRequest) ] =
    chargeRequests.map(req => (req.cardNumber, req) ) .generateName val
chargesWithChargesForCard: Event[ (CardNumber, (ChargeRequest,
Long) ) ] =
    chargesKeyedByNumber.lookup(numChargesForCard)
``` lookupKeyBefore/lookupBefore

```
def lookupKeyBefore[V] (feature: Feature[K, V] ) : Event[ (K, V) ] = def
lookupBefore[V] (feature: Feature[K, V] ) : Event[ (K, (U, V) ) ] =
```

These two functions have identical signatures to lookupKey and lookup. The difference is that the lookup occurs before the current feed is processed. For example, in the cardNumbersWithChargeCounts Event, the Long value will never be 0, because the count for a card number includes the current charge. If lookupKeyBefore is used, then for each card's first charge, the Long in cardNumbers WithChargeCounts would be 0.

lookupByOption

```
def lookupByOption[K, V] (feature: Feature[K, V] ) (f: E => Option
[K] ) :
Event0 [ (E, Option [V] ) ]
```

If a valid key for our records cannot be provided, lookupByOption allows for safely performing lookups, as f can return None when there was no valid key for a given E. The feeds in the resulting Event0[(E, Option[V])] will have type (E, None) in the cases where we could not produce a valid key from E.

If sources have optional fields that are to be keyed on, then lookupByOption can be used. For example, the MerchantAccountApplication case class has an optional ownerName: Option[String] field ownerName: Option[String] field. A feature can be written that counts how many how many businesses an owner has registered:

```
val numBusinessesByOwner: Feature[String, Long] = Feature
    .count(accountApplications.map(_.ownerName).collect {
    case Some(name) => name
    })
    .generateName
    val accountApplicationsWithOwnerCount:Event0
    [ (MerchantAccountApplication, Option[ Long] ) ] =
    accountApplications.lookupByOption(numBusinessesByOwner)
    (_.ownerName)
```

In the resulting Event, if there was no owner name provided in the application, the Option[Long] will be None.

lookupIfDefined

```
def lookupIfDefined[K, V] (feature: Feature[K, V] ) (f:[ ][]
    E => Option[K] ) : Event0[ (E, V) ]
```

This is similar to lookupByOption, but for the feeds where f returned None, the feed is dropped. In the previous example, there would be no feeds in accountApplicationsWithOwnerCount for applications without an owner name.

An Example Computer System

Figure 9:
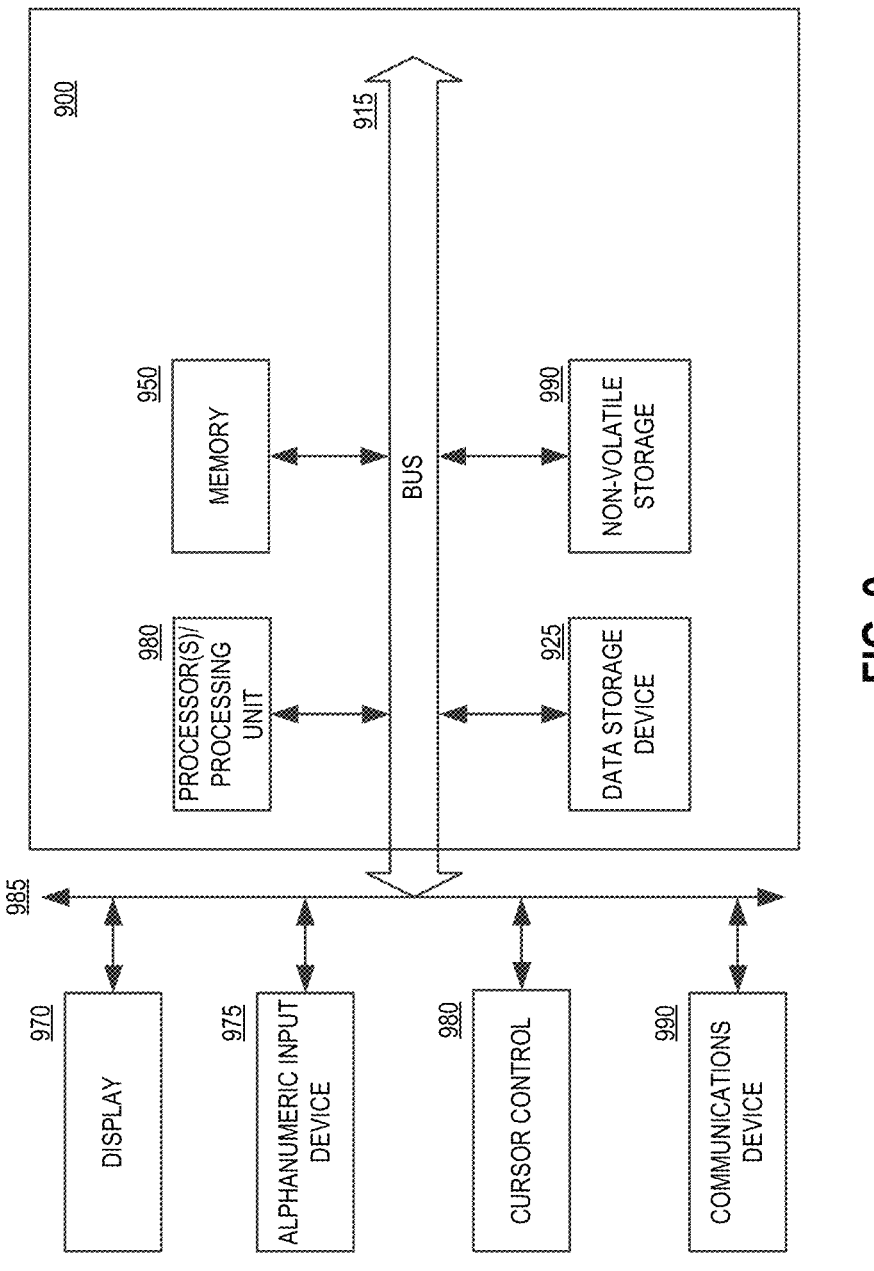
FIG. 9 is a block diagram of one embodiment of a computer system.

FIG. 9 is one embodiment of a computer system that may be used to support the systems and operations discussed herein. It will be apparent to those of ordinary skill in the art, however that other alternative systems of various system architectures may also be used.

The data processing system illustrated in FIG. 9 includes a bus or other internal communication means 915 for communicating information, and a processor(s) 910 coupled to the bus 915 for processing information. The system further comprises a random-access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor(s) 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a light emitting diode (LED) display or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a touchpad, mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments as discussed herein.

In one embodiment, processor(s) 910 executes instructions to perform the operations described herein, including those of the machine learning platform such as feature creating, compilation and computation.

It will be appreciated by those of ordinary skill in the art that any configuration of the system may be used for various purposes according to the particular implementation. The control logic or software implementing the described embodiments can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The embodiments discussed herein may also be embodied in a handheld or portable device containing a subset of the computer hardware components described above. For example, the handheld device may be configured to contain only the bus 985, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function.

There is a number of example embodiments described herein.

Example 1 is a method A method for processing data with a machine learning framework comprising: creating a plurality of features as independent features, each feature of the plurality features being based on one or more events that model a plurality of records related to payment processing information; creating a final feature that groups the plurality of features together, such that each feature of the plurality of features represents a sub-feature of the final feature; compiling the plurality of features and the final feature; computing, using a computing platform, each of the plurality of features as a separate job, including sending network related communications to access the payment processing information from one or more remote storage locations; and computing, using a computing platform, the final feature separately from computing the plurality of features, including grouping results of running each of the plurality of features together.

Example 2 is the method of example 1 that may optionally include that the plurality of features as a separate job comprises running two or more features of the plurality of features in parallel.

Example 3 is the method of example 1 that may optionally include that the features of the plurality of features and final features are user specified via an application programming interface (API).

Example 4 is the method of example 1 that may optionally include updating one or more predictive models using a result from computing the final feature.

Example 5 is the method of example 1 that may optionally include after computing the final feature, storing separately, for each feature in the plurality of features, results from computing said each feature; and enabling access to one or more of the results from computing each feature of the plurality feature for individual use by another feature other than the final feature.

Example 6 is the method of example 1 that may optionally include that data from computing the plurality of features is stored in columnar format, and wherein grouping results of running each of the plurality of features together as part of computing the final feature is made, at least in part, based on the columnar format.

Example 7 is the method of example 1 that may optionally include that at least one event of the one or more events of at least one feature of the plurality of features perform a lookup to attached a value of another feature to a feed in the at least one event.

Example 8 is the method of example 7 that may optionally include that the lookup retains all the information associated with an event.

Example 9 is the method of example 7 that may optionally include that 8 wherein the lookup retains only a key associated with an event.

Example 10 is the method of example 1 that may optionally include obtaining at least one feature of the plurality of features by aggregating events of the one or more events.

Example 11 is a system comprising: a network interface; a memory to store instructions; one or more processors coupled to the memory and the network interface to execute the stored instructions to: create a plurality of features as independent features, each feature of the plurality features being based on one or more events that model a plurality of records related to payment processing information; create a final feature that groups the plurality of features together, such that each feature of the plurality of features represents a sub-feature of the final feature; compile the plurality of features and the final feature; compute, using a computing platform, each of the plurality of features as a separate job, including sending network related communications to access the payment processing information from one or more remote storage locations; compute, using a computing platform, the final feature separately from computing the plurality of features, including grouping results of running each of the plurality of features together.

Example 12 is the system of example 11 that may optionally include that each of the plurality of features are computed as a separate job by running two or more features of the plurality of features in parallel.

Example 13 is the system of example 11 that may optionally include that the features of the plurality of features and final features are user specified via an application programming interface (API).

Example 14 is the system of example 11 that may optionally include that the one or more processor are operable to update one or more predictive models using a result from computing the final feature.

Example 15 is the system of example 11 that may optionally include that the one or more processor are operable to, after computing the final feature, store separately, for each feature in the plurality of features, results from computing said each feature; and enable access to one or more of the results from computing each feature of the plurality feature for individual use by another feature other than the final feature.

Example 16 is the system of example 11 that may optionally include that data from computing the plurality of features is stored in columnar format, and wherein grouping results of running each of the plurality of features together as part of computing the final feature is made, at least in part, based on the columnar format.

Example 17 is the system of example 11 that may optionally include that at least one event of the one or more events of at least one feature of the plurality of features perform a lookup to attached a value of another feature to a feed in the at least one event.

Example 18 is the system of example 17 that may optionally include that the lookup retains all the information associated with an event.

Example 19 is the system of example 17 that may optionally include that the lookup retains only a key associated with an event.

Example 20 is the system of example 11 that may optionally include that the one or more processor are operable to obtain at least one feature of the plurality of features by aggregating events of the one or more events.

Example 21 is one or more non-transitory computer readable storage media having instructions stored thereupon which, when executed by a machine learning framework having at least a processor and a memory therein, cause the framework to perform operations comprising: creating a plurality of features as independent features, each feature of the plurality features being based on one or more events that model a plurality of records related to payment processing information; creating a final feature that groups the plurality of features together, such that each feature of the plurality of features represents a sub-feature of the final feature; compiling the plurality of features and the final feature; computing, using a computing platform, each of the plurality of features as a separate job, including sending network related communications to access the payment processing information from one or more remote storage locations; computing, using a computing platform, the final feature separately from computing the plurality of features, including grouping results of running each of the plurality of features together.

Example 22 is the is one or more non-transitory computer readable storage media of example 21 that may optionally include that running each of the plurality of features as a separate job comprises running two or more features of the plurality of features in parallel.

Example 23 is the is one or more non-transitory computer readable storage media of example 21 that may optionally include that the features of the plurality of features and final features are user specified via an application programming interface (API).

Example 24 is the is one or more non-transitory computer readable storage media of example 21 that may optionally include updating one or more predictive models using a result from computing the final feature.

Example 25 is the is one or more non-transitory computer readable storage media of example 21 that may optionally include that at least one event of the one or more events of at least one feature of the plurality of features perform a lookup to attached a value of another feature to a feed in the at least one event.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method for processing data, the method comprising:
    defining, at a computing platform, a plurality of features as independent features, wherein each feature of the plurality of features is defined by a key and a value type, and each feature of the plurality of features is further defined to execute a mapper that converts data records generated by disparate systems and having the key and value type to a stream of events of a same event object type having a unified data format;

executing, by the computing platform, the mapper defined for each feature of the plurality of features comprising:
        accessing a plurality of data records generated by the disparate systems and generating the stream of events of the same event object type in the unified data format from the plurality of data records to model a temporal stream of time-stamped records, the mapper adding a read-only timestamp to each of the stream of events;
    defining, at the computing platform, a final feature based on the plurality of features, such that each feature of the plurality of features is used for computation of the final feature;
    compiling, by the computing platform, the plurality of features and the final feature into a plurality of jobs, wherein each job of the plurality of jobs is compiled by generating a combiner that aggregates events from a corresponding stream of events; and
    executing each of the plurality of jobs using the computing platform, wherein executing a job comprises:
        executing, using the computing platform, combiners compiled for each of the plurality of features to generate a value for each of the plurality of features, including sending network related communications to access one or more of the time-stamped records, based on a key that corresponds to said each of the plurality of features, from one or more remote storage locations, and
        executing, using the computing platform, a combiner compiled for the final feature to generate a value for the final feature separately from computing the values for the plurality of features, including grouping together the values for the plurality of features.

2. The method defined in claim 1 wherein each of the plurality of features is run as a separate job comprising performing jobs for two or more features of the plurality of features in parallel in real time or as a batch computing process.

3. The method defined in claim 1 wherein the features of the plurality of features and final features are user specified via an application programming interface (API).

4. The method defined in claim 1 further comprising updating one or more predictive models using a result from computing the final feature.

5. The method defined in claim 1 further comprising:
    after computing the value for the final feature, storing separately, for each feature in the plurality of features, results from computing a corresponding value computed for said each feature; and
    enabling access to one or more of the results from computing each feature of the plurality of features for individual use by another feature other than the final feature.

6. The method defined in claim 1 wherein data from computing the plurality of features is stored in columnar format, and wherein grouping results of running each of the plurality of features together as part of computing the final feature is made, at least in part, based on the columnar format.

7. The method defined in claim 1 wherein at least one event of the stream of events of at least one feature of the plurality of features performs a lookup to attach a value of another feature to a feed in the at least one event.

8. The method defined in claim 7 wherein the lookup retains all information associated with an event.

9. The method defined in claim 7 wherein the lookup retains only a key associated with an event.

10. The method defined in claim 1 further comprising obtaining at least one feature of the plurality of features by aggregating events from a corresponding stream of events.

11. A system comprising:

a network interface;

a memory to store instructions;

one or more processors coupled to the memory and the network interface to execute the stored instructions to:

define a plurality of features as independent features, wherein each feature of the plurality features is defined by a key and a value type, and each feature of the plurality of features is further defined to execute a mapper that converts data records generated by disparate systems and having the key and value type to a stream of events of a same event object type having a unified data format;

execute the mapper defined for each feature of the plurality of features to access a plurality of data records generated by the disparate systems and generate the stream of events of the same event object type in the unified data format from the plurality of data records to model a temporal stream of time-stamped records, the mapper adding a read-only timestamp to each of the stream of events;

define a final feature that groups the plurality of features together, such that each feature of the plurality of features represents a sub-feature of the final feature;

compile the plurality of features and the final feature into a plurality of jobs, wherein each job of the plurality of jobs is compiled by generating a combiner that aggregates events from a corresponding stream of events; and execute each of the plurality of jobs using a computing platform, wherein execution of a job comprises the one or more processors to:

execute combiners compiled for jobs associated with the plurality of features to generate a value for each of the plurality of features, including sending network related communications to access one or more of the time-stamped records, based on a key that corresponds to said each of the plurality of features, from one or more remote storage locations, and execute a combiner compiled for the final feature to generate a value for the final feature separately from computing the values for the plurality of features, including grouping together the values for the plurality of features.

12. The system defined in claim 11 wherein each of the plurality of features is computed as a separate job by performing jobs for two or more features of the plurality of features in parallel in real time or as a batch computing process.

13. The system defined in claim 11 wherein the features of the plurality of features and final features are user specified via an application programming interface (API).

14. The system defined in claim 11 wherein the one or more processors are operable to update one or more predictive models using a result from computing the final feature.

15. The system defined in claim 11 wherein the one or more processors are operable to, after computing the value for the final feature, store separately, for each feature in the plurality of features, results from computing a corresponding value computed for said each feature; and enable access to one or more of the results from computing each feature of the plurality features for individual use by another feature other than the final feature.

16. The system defined in claim 11 wherein data from computing the plurality of features is stored in columnar format, and wherein grouping results of running each of the plurality of features together as part of computing the final feature is made, at least in part, based on the columnar format.

17. The system defined in claim 11 wherein at least one event of the stream of events of at least one feature of the plurality of features performs a lookup to attach a value of another feature to a feed in the at least one event.

18. The system defined in claim 17 wherein the lookup retains all information associated with an event.

19. The system defined in claim 17 wherein the lookup retains only a key associated with an event.

20. The system defined in claim 11 wherein the one or more processors are operable to obtain at least one feature of the plurality of features by aggregating events from a corresponding stream of events.

21. One or more non-transitory computer readable storage media having instructions stored thereupon which, when executed by a computing platform having at least a processor and a memory therein, cause the computing platform to perform operations comprising:

defining, at the computing platform, a plurality of features as independent features, wherein each feature of the plurality of features is defined by a key and a value type, and each feature of the plurality of features is further defined to execute a mapper that converts data records generated by disparate systems and having the key and value type to a stream of events of a same event object type having a unified data format;

executing, by the computing platform, the mapper defined for each feature of the plurality of features comprising:

accessing, by the mapper, a plurality of data records generated by the disparate systems and generating, by the mapper, the stream of events of the same event object type in the unified data format from the plurality of data records to model a temporal stream of time-stamped records, the mapper adding a read-only timestamp to each of the stream of events;

defining, at the computing platform, a final feature based on the plurality of features, such that each feature of the plurality of features is used for computation of the final feature;

compiling, by the computing platform, the plurality of features and the final feature into a plurality of jobs, wherein each job of the plurality of jobs is compiled by generating a combiner that aggregates events from a corresponding stream of events; and executing each of the plurality of jobs using the computing platform, wherein executing a job comprises:

executing, using the computing platform, combiners compiled for each of the plurality of features to generate a value for each of the plurality of features, including sending network related communications to access one or more of the time-stamped records, based on a key that corresponds to said each of the plurality of features, from one or more remote storage locations, and executing, using the computing platform, a combiner compiled for the final feature to generate a value for the final feature separately from computing the values for the plurality of features, including grouping together the values for the plurality of features.

22. The storage media defined in claim 21 wherein each of the plurality of features is run as a separate job comprising performing jobs for two or more features of the plurality of features in parallel in real time or as a batch computing process.

23. The storage media defined in claim 21 wherein the features of the plurality of features and final features are user specified via an application programming interface (API).

24. The storage media defined in claim 21 further comprising updating one or more predictive models using a result from computing the final feature.

25. The storage media defined in claim 21 wherein at least one event of the stream of events of at least one feature of the plurality of features performs a lookup to attach a value of another feature to a feed in the at least one event.

*     *     *     *     *